(12) United States Patent
Sadok et al.

(10) Patent No.: US 6,397,679 B1
(45) Date of Patent: Jun. 4, 2002

(54) METHOD AND APPARATUS FOR DISCRIMINATING ULTRASONIC ECHOES USING WAVELET FUNCTION PROCESSING

(75) Inventors: Mokhtar M. Sadok, Vergennes; Scott Robert Durkee, New Haven, both of VT (US)

(73) Assignee: Simmonds Precision Products, Inc., Charlotte, NC (US)

( * ) Notice: Subject to any disclaimer, the term of this patent is extended or adjusted under 35 U.S.C. 154(b) by 0 days.

(21) Appl. No.: 09/539,153

(22) Filed: Mar. 30, 2000

(51) Int. Cl.[7] .............................................. G01N 29/24
(52) U.S. Cl. ........................................ 73/596; 73/602
(58) Field of Search .......................... 73/596, 597, 598, 73/599, 600, 602, 606, 607, 608, 620, 627, 629, 632, 642, 644

(56) References Cited

U.S. PATENT DOCUMENTS

| | | | | |
|---|---|---|---|---|
| 5,561,431 A | * | 10/1996 | Peele et al. ............... | 342/90 |
| 5,922,961 A | * | 7/1999 | Hsu et al. ................. | 73/606 |
| 6,094,631 A | * | 7/2000 | Li et al. .................... | 704/230 |
| 6,192,758 B1 | * | 2/2001 | Huang ....................... | 73/594 |

* cited by examiner

*Primary Examiner*—Helen Kwok
(74) *Attorney, Agent, or Firm*—James M. Rashid; Calfee, Halter & Griswold LLP

(57) ABSTRACT

A method of and apparatus for discriminating among ultrasonic echoes reflected from various objects in a tank containing liquid is disclosed. Ultrasonic signals are generated from an ultrasonic transducer into liquid contained in a tank. Ultrasonic echoes are received by the transducer from various objects in the tank including a surface of the liquid in response to the generated ultrasonic signal and are converted into electrical echo signals representative thereof. Data samples of the electrical echo signals are generated and processed by a signal processor using wavelet function processing to generate wavelet coefficients thereof in a wavelet domain. The wavelet coefficients of the echo data samples are used to discriminate the ultrasonic echoes reflected from the various objects in or part of the tank. In one embodiment, echoes reflected from the liquid surface are discriminated from echoes reflected from other objects based on the wavelet coefficients of the echo data samples of each. In another embodiment, energy of each of the ultrasonic echoes determined from the wavelet coefficients thereof is used to discriminate the ultrasonic echoes from the various reflective surfaces.

20 Claims, 14 Drawing Sheets

(10 of 14 Drawing Sheet(s) Filed in Color)

METHOD AND APPARATUS FOR DISCRIMINATING ULTRASONIC ECHOES USING WAVELET FUNCTION PROCESSING

BACKGROUND OF THE INVENTION

The present invention is directed to the ultrasonic measurement of liquid quantity in a tank, in general, and more particularly to, a method of and apparatus for discriminating among ultrasonic echoes reflected from various objects in the tank containing liquid using wavelet function processing.

Generally, in ultrasonic liquid measurement systems, an ultrasonic transducer is disposed at a tank containing a liquid for measuring the quantity of liquid therein. The ultrasonic transducer is excited to produce ultrasonic pulses into the liquid and receive echoes from the liquid surface and various objects that may be disposed in or a part of the tank. The received echoes are converted into electrical signals by the transducer for down stream electronic signal processing thereof. A metal target or pin is usually disposed at a fixed and predetermined distance from the ultrasonic transducer 40 within the tank so as to compute the speed of the ultrasonic pulse through the liquid in the tank. Briefly, since speed is equal to distance per unit time, then knowing the distance to the target and time over which an ultrasonic pulse is generated and its echo from the target received, speed of the ultrasonic pulse may be calculated. Accordingly, knowing the speed and being able to measure the round trip time from when an ultrasonic pulse is generated until its echo reflected from an object, like the fluid surface, for example, is received, the distance to the reflected object may be calculated. With a prior knowledge of the tank geometry and the distance to the liquid surface, the liquid quantity in the tank may be calculated.

This ultrasonic liquid measurement process seems straightforward. A problem however is being able to discriminate among the echoes reflected from the various objects within the tank in response to the generated ultrasonic pulse. In other words, which received echo is being reflected from which object within the tank. In particular, it is important to determine the difference between an echo reflected by the liquid surface and an echo reflected from an object with a different acoustic property (e.g. impedance) from that of the liquid surface, like the fixed target or tank sides or top, for example. An embodiment of a method and apparatus for discriminating among echoes reflected from various objects within the tank containing liquid will now be described.

SUMMARY OF THE INVENTION

In accordance with one aspect of the present invention, a method of discriminating among ultrasonic echoes reflected from various objects in a tank containing liquid comprises the steps of: generating an ultrasonic signal in the tank of liquid; receiving ultrasonic echoes reflected from various objects in the tank including a surface of the liquid in response to the generated ultrasonic signal; converting the received ultrasonic echoes into electrical echo signals representative thereof; sampling the electrical echo signals in time to generate data samples thereof; processing the data samples of each echo using a wavelet function to generate wavelet coefficients thereof in a wavelet domain; and discriminating the ultrasonic echoes reflected from the various objects based on the wavelet coefficients of the echo data samples. In one embodiment, the method step of discriminating includes discriminating an echo reflected from the liquid surface from echoes reflected from other objects based on the wavelet coefficients of the echo data samples of each. In another embodiment, the method step of discriminating includes determining an energy of each ultrasonic echo from the wavelet coefficients thereof; and discriminating the ultrasonic echoes based on the determined energies thereof.

In accordance with another aspect of the present invention, apparatus for discriminating among ultrasonic echoes reflected from various objects in a tank containing liquid comprises: means for exciting the ultrasonic transducer to generate an ultrasonic signal in the tank, the ultrasonic transducer converting the received ultrasonic echoes into electrical echo signals representative thereof; means for sampling and digitizing the electrical echo signals in time to generate digitized data samples thereof; and means for processing the digitized data samples of each echo using a wavelet function to generate wavelet coefficients thereof in a wavelet domain and to discriminate the ultrasonic echoes reflected from the various objects based on the wavelet coefficients of the echo data samples. In one embodiment, the apparatus includes a buffer memory for storing the digitized data samples of each reflected echo, and a programmed digital processor for processing the digitized data samples. The programmed digital processor may include a program for discriminating an echo reflected by the liquid surface from echoes reflected by objects with different acoustic properties from the liquid surface based on the wavelet coefficients of the echo data samples thereof. In another embodiment, the tank may be an aircraft fuel tank and the liquid comprising aircraft fuel.

BRIEF DESCRIPTION OF THE DRAWINGS

The file of this patent contains at least one drawing executed in color. Copies of this patent with color drawings will be provided by the Patent and Trademark Office upon request and payment of the necessary fee.

DESCRIPTION OF THE PREFERRED EMBODIMENT

Figure 1:
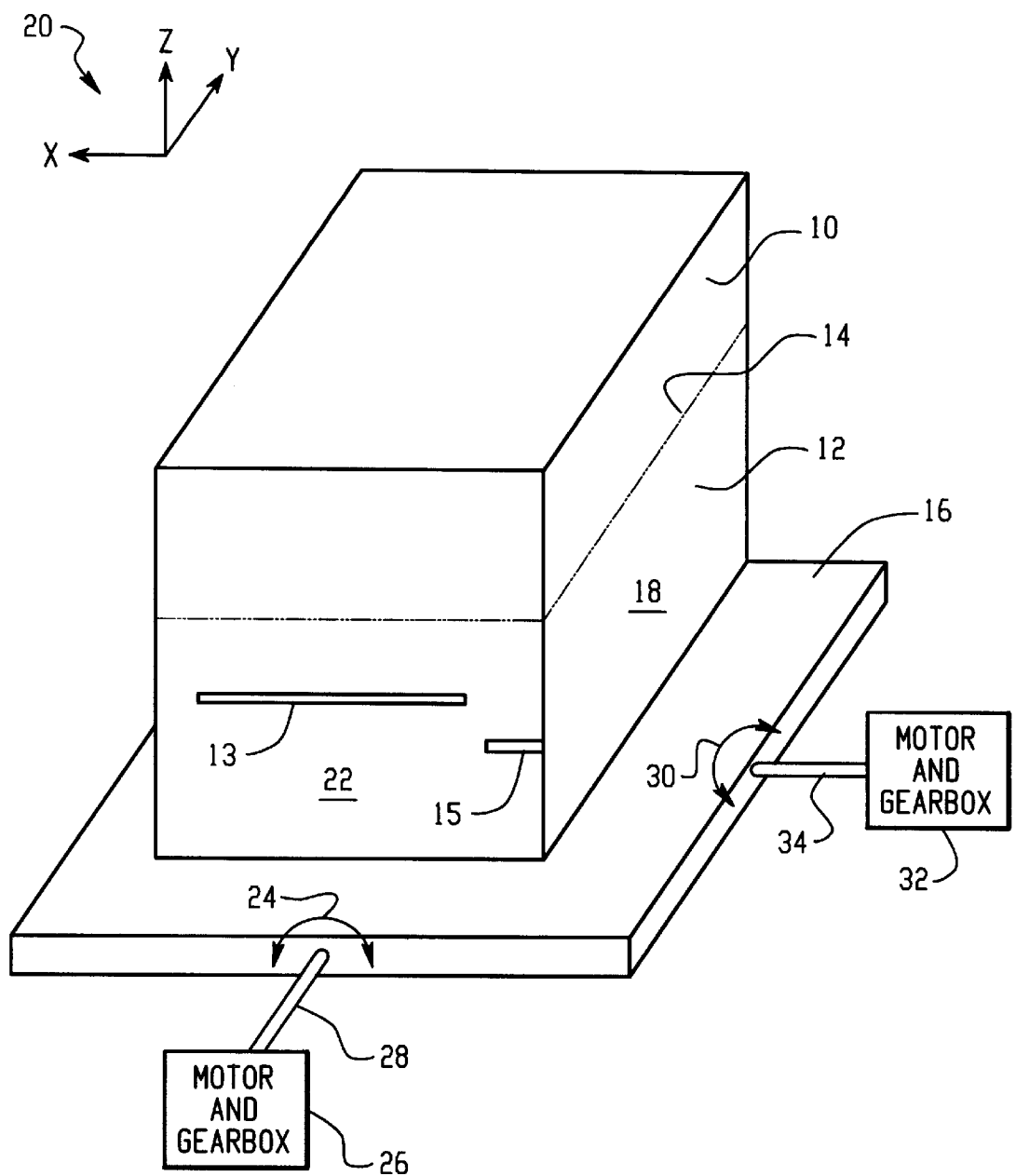
FIG. 1 is an illustration of an exemplary environment for embodying the present invention.

An exemplary environment for the embodiment is illustrated in FIG. 1. In such an environment, the tank 10 and motion table 16 are intended to model an aircraft fuel tank on-board an aircraft that may undergo pitch and roll motion, and the liquid is intended to model fuel in an aircraft fuel tank. It is understood, however, that the principles of the present invention should not be limited in any way, shape or form based on the particular tank being used or liquid contained therein. Referring to FIG. 1, a tank 10 of a rectangular cross-sectional form having top, bottom and sides of metallic material contains a quantity of liquid 12, which for the present example may include a fuel or fuel-like hydrocarbon at a liquid level 14 within the tank 10. A metal slab 13 and at least one metal target or pin 15 may be disposed within the tank 10 for purposes that will be better understood from the description hereinbelow. The tank, slab and target may each be made from materials or substances other than metal so long as the acoustic properties thereof (e.g. acoustic impedance) are not similar to the liquid acoustic properties. The tank 10 is disposed on a platform 16, which may be a motion table, for example. The tank is oriented on the table 16 to have one side 18 parallel with an Y–Z plane of a three dimensional X, Y and Z axis Cartesian coordinate system shown at 20. Another side 22 of the tank 10 is oriented parallel to an X–Z plane of the Cartesian coordinate system.

In the present model, pitch motion 24 is simulated in the X–Z plane by coupling the table 16 to an electrical motor and conventional gear box assembly represented in the illustration of Figure by the block 26 via a shaft 28 that is substantially perpendicular to the X–Z plane. Accordingly, the motor and associated gearbox 26 may control the movement of the table and tank through clockwise and counterclockwise pitch angles in the X–Z plane as would normally occur during a flight of an aircraft. Likewise, roll motion 30 is simulated in the Y–Z plane coupling the table 16 to another electrical motor and conventional gear box assembly represented in the illustration of Figure by the block 32 via a shaft 34 that is substantially perpendicular to the Y–Z plane. And, similarly, the motor and associated gearbox 32 may control the movement of the table and tank through clockwise and counterclockwise roll angles in the Y–Z plane as would normally occur during a flight of an aircraft.

Figure 2:
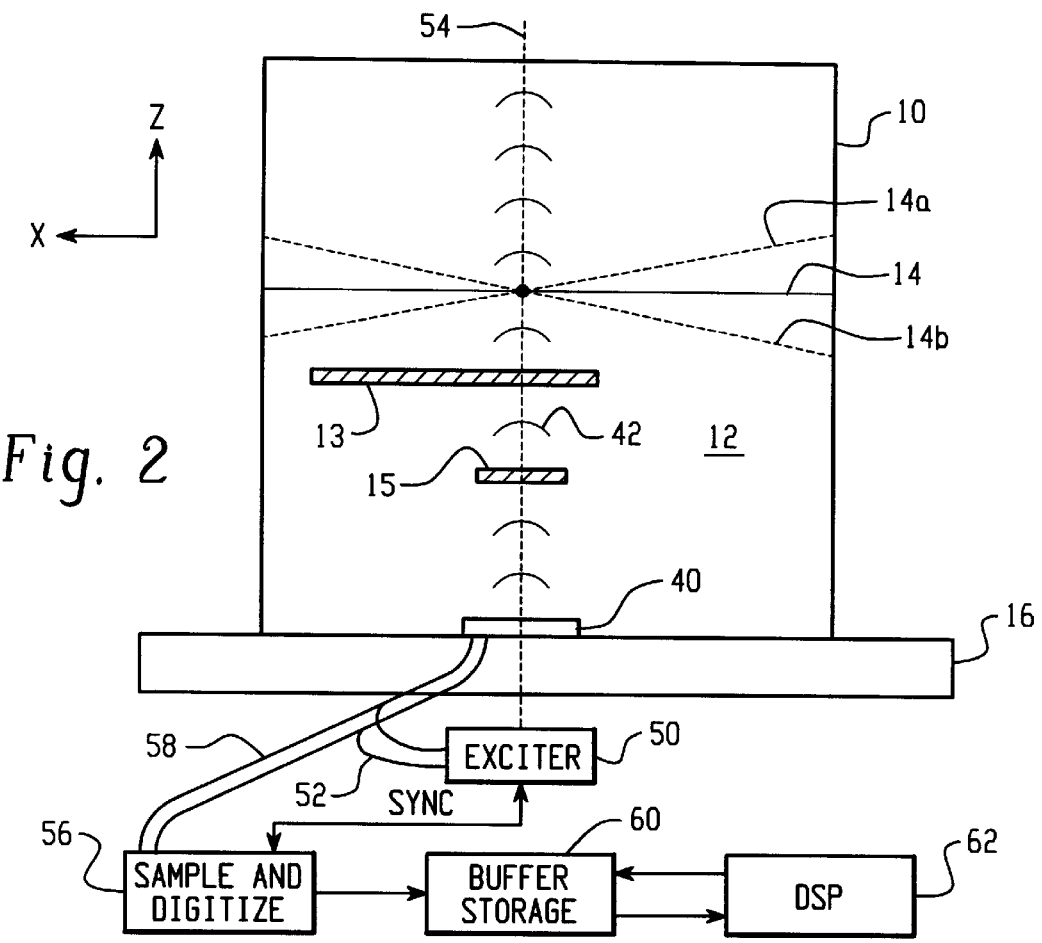
FIG. 2 is a cross-sectional illustration of one embodiment of the present invention.

In FIG. 2 is shown an illustration of the tank 10 in a cross sectional view along an X–Z plane. An ultrasonic transducer 40 which may be of the type described in the copending U.S. patent application bearing application Ser. No. 08/996,747, filed Dec. 23, 1997 and assigned to the same assignee as the instant application, for example, is disposed at the tank 10. The U.S. patent application Ser. No. 08/996,747 is incorporated by reference into the instant application for describing in greater detail various elements of the embodiment. However, it is understood that any ultrasonic transducer conventional or otherwise may be used in the embodiment without deviating from the principles of the present invention.

In the present embodiment, the transducer 40 is disposed at the bottom of the tank 10 and generates ultrasonic signals represented by lines 42 upward toward the slab 13, the target 15, the liquid surface 14, and tank sides and top. In response to the generated ultrasonic signal, ultrasonic echoes are reflected from the liquid surface 14, slab 13, target 15 and the sides and top of the tank back to the transducer 40 where they are received and converted into electrical signals representative of the ultrasonic echoes. The slab (plan) 13 is included to show by way of example that the characteristics of a time-frequency map of echoes (which will become more apparent from the description hereinbelow) are due to differences in substance or material (i.e. air versus metal) and not due to difference in shapes (line or pin versus plan). The angle of incidence of the fluid surface 14 may be varied by controlling the pitch motion of the table 16 as described in connection with the environment of FIG. 1. A clockwise variation in pitch will result in the fluid surface at an orientation or angle of incidence as shown by the dashed line 14a with respect to the ultrasonic signal 42 and similarly, a counterclockwise variation in pitch will result in the fluid surface at an orientation or angle of incidence 14b.

Figure 3:
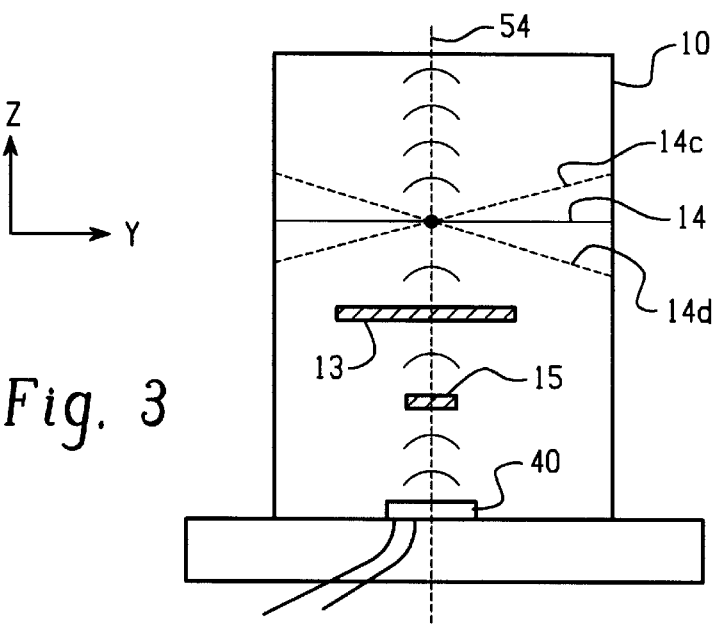
FIG. 3 is another cross-sectional view of the embodiment of depicted in FIG. 2.

In FIG. 3 is shown an illustration of the tank 10 in a cross sectional view along an Y–Z plane. The angle of incidence of the fluid surface 14 may be also varied by controlling the roll motion of the table 16 as described in connection with the environment of FIG. 1. A clockwise variation in roll will result in the fluid surface at an orientation or angle of incidence as shown by the dashed line 14c with respect to the ultrasonic signal 42 and similarly, a counterclockwise variation in roll will result in the fluid surface at an orientation or angle of incidence 14d. Accordingly, the angles of incidence of the fluid surface and other objects, like the slab 13 and pin 15, in the tank 10 may be varied with respect to the ultrasonic signal 42 in a similar manner, as they would be during an aircraft flight.

The target or pin 15 is disposed at a fixed and predetermined distance from the ultrasonic transducer 40 within the tank 10 so as to compute the speed of the ultrasonic signal 42 through the liquid 12. Briefly, since speed is equal to distance per unit time, then knowing the distance to the target 15 and time over which an ultrasonic signal is generated and its echo from the target is received, speed of the ultrasonic signal may be calculated. Accordingly, knowing the speed and being able to measure the time over which an ultrasonic signal is generated and its echo reflected from an object, like the fluid surface 14, for example, is received, the distance to the reflected object may be calculated. The problem is being able to discriminate among the echoes reflected from the various objects within the tank in response to the generated ultrasonic signal. In other words, which received echo is being reflected from which object within the tank. In particular, it is important to determine the difference between an echo reflected by the fluid surface and an echo reflected from an object, like the fixed target or tank sides or top, for example. An embodiment of a method and apparatus for discriminating among echoes reflected from various objects within the tank containing liquid will now be described.

Referring back to FIG. 2, an exciter circuit shown by the block 50 is coupled to the ultrasonic transducer 40 over signal lines 52 to cause the transducer 40 to generate an ultrasonic signal 42 within the tank 10 substantially along the dot-dashed line 54. The exciter circuit 50 may be of the type described in the above referenced U.S. patent application Ser. No. 08/996,747, for example. However, it is understood that any exciter circuit conventional or otherwise may be used without deviating from the principles of the present invention. The ultrasonic transducer receives ultrasonic echoes from various objects within the tank 10, like the slab 13, the surface of the fluid 14, the target 15, and the top and sides of the tank, for example, in response to the generated ultrasonic signal 42. In the present embodiment, the incidence angles were varied randomly by controlling the pitch and roll motions of the table 16 as described supra.

Figure 4A:
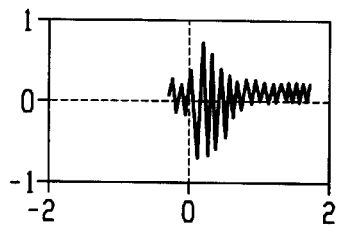
FIGS. 4A through 4K are graphs of exemplary echoes received from various objects within the tank of liquid of the embodiment of FIG. 2.
Figure 4B:
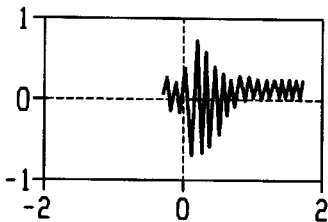
Figure 4C:
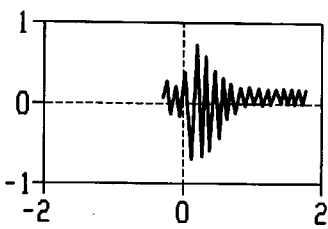
Figure 4D:
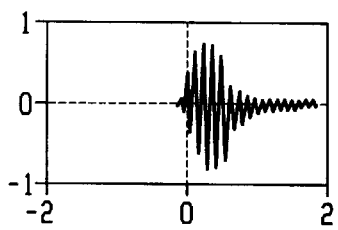
Figure 4E:
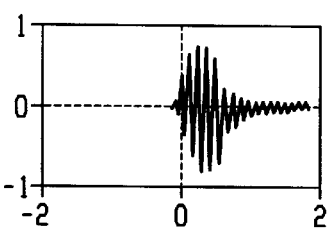
Figure 4F:
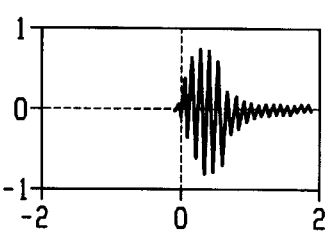
Figure 4G:
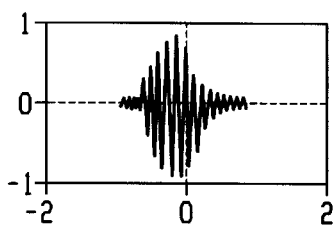
Figure 4H:
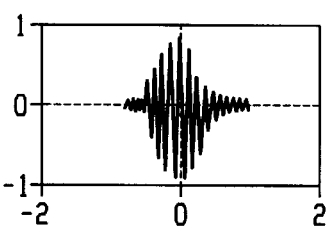
Figure 4I:
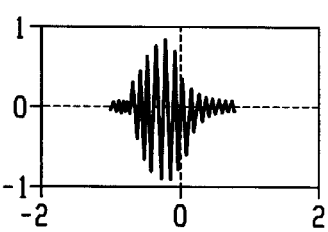
Figure 4J:
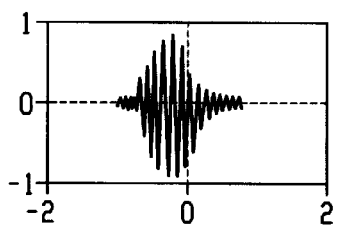
Figure 4K:
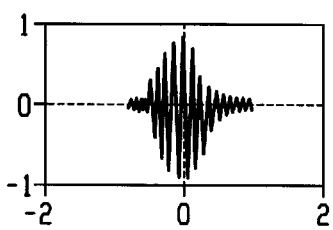
Figure 5:
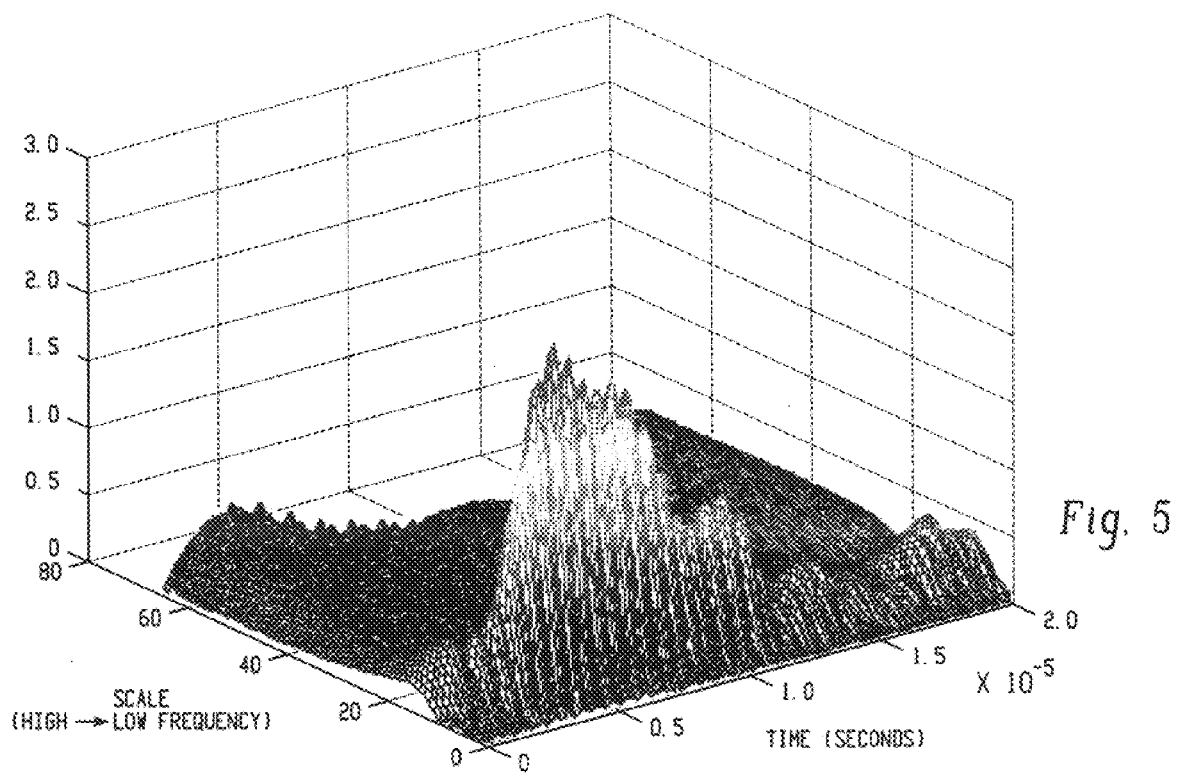
FIGS. 5 and 6 are wavelet time-frequency graphs illustrating the resulting wavelet coefficients from a wavelet function processing of echoes received from two different metal slabs in accordance with the embodiment of FIG. 2.
Figure 6:
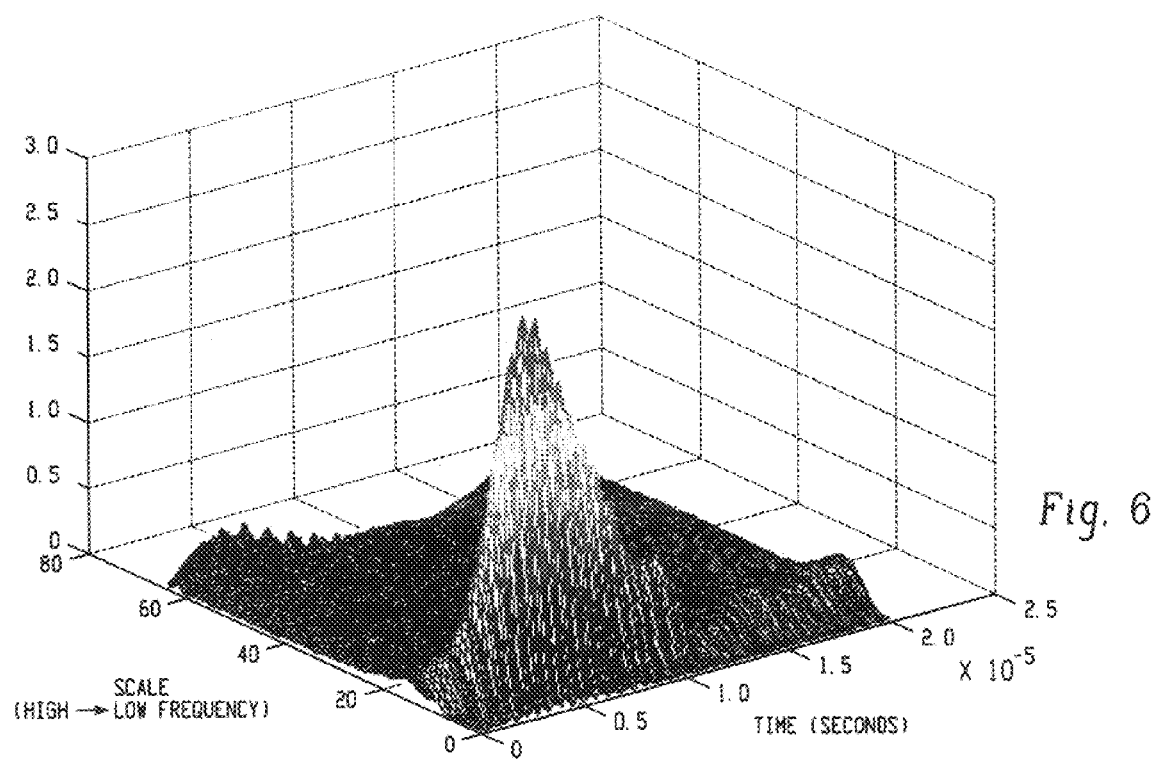
Figure 7:
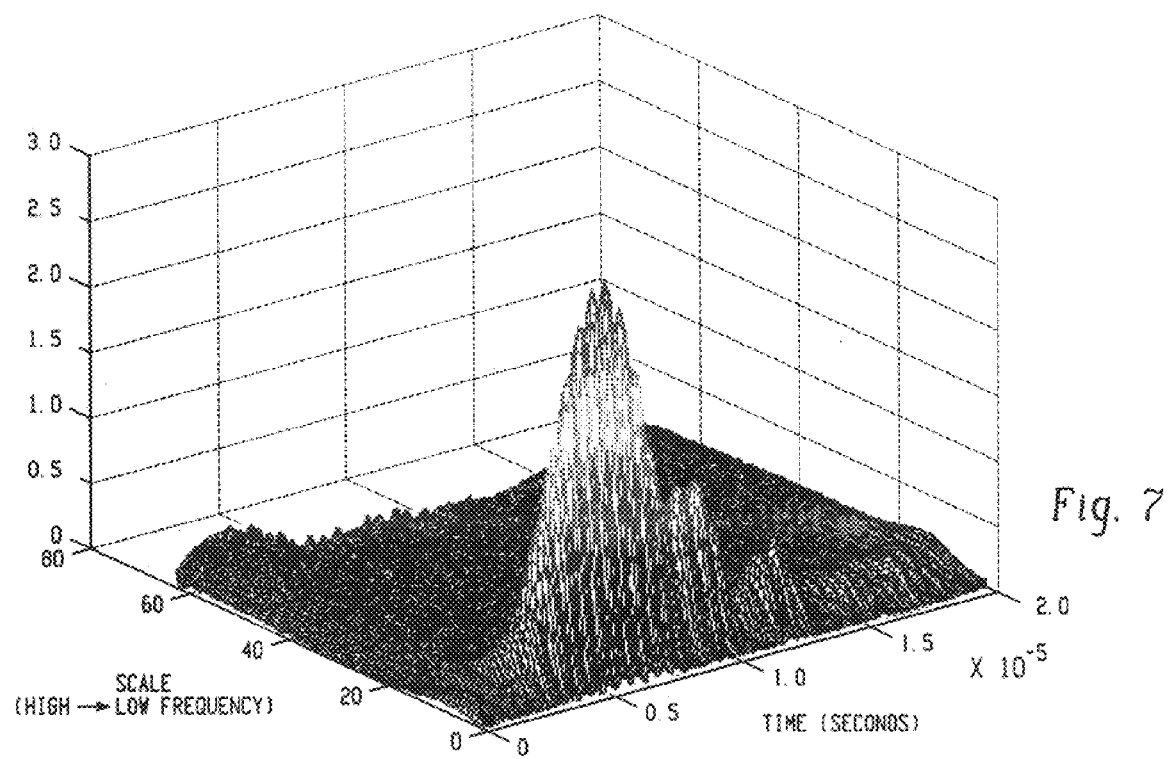
FIG. 7 is a wavelet time-frequency graph illustrating the resulting wavelet coefficients from a wavelet function processing of an echo received from a target or metal pin in accordance with the embodiment of FIG. 2.
Figure 8:
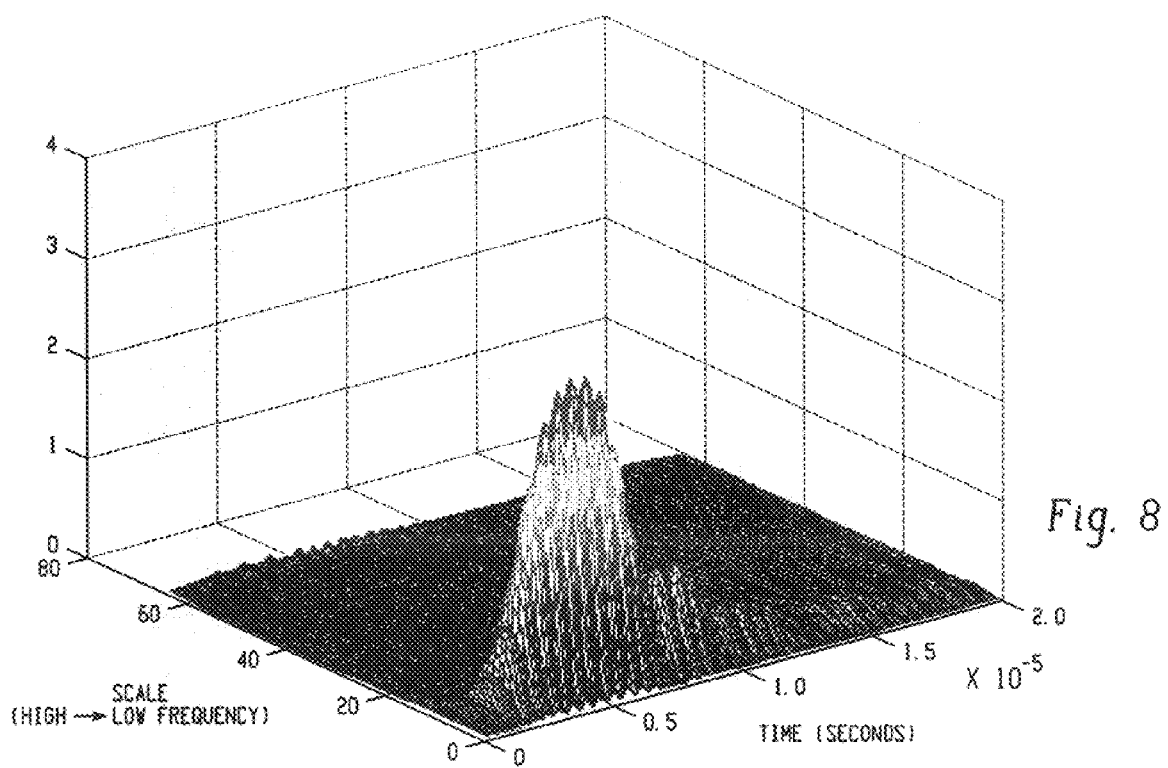
FIGS. 8 through 14 are wavelet time-frequency graphs illustrating the resulting wavelet coefficients from a wavelet function processing of echoes received from a liquid surface at various angles of incidence in accordance with the embodiment of FIG. 2.
Figure 9:
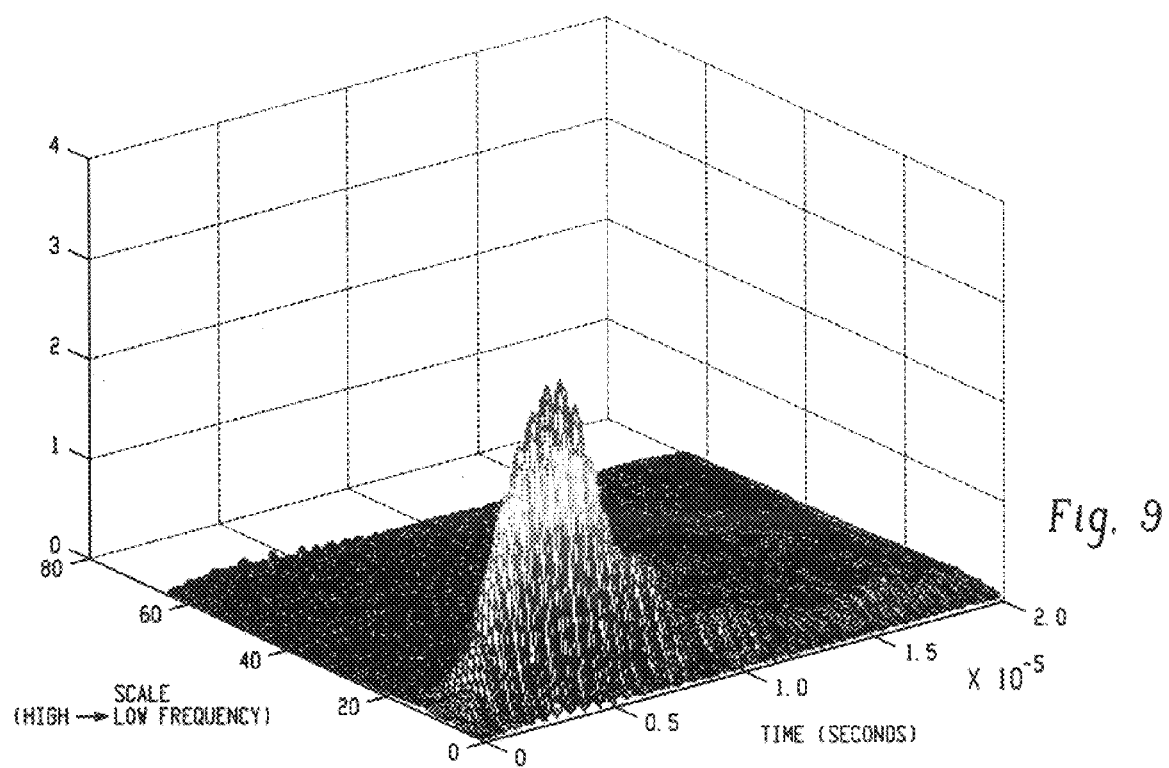
Figure 10:
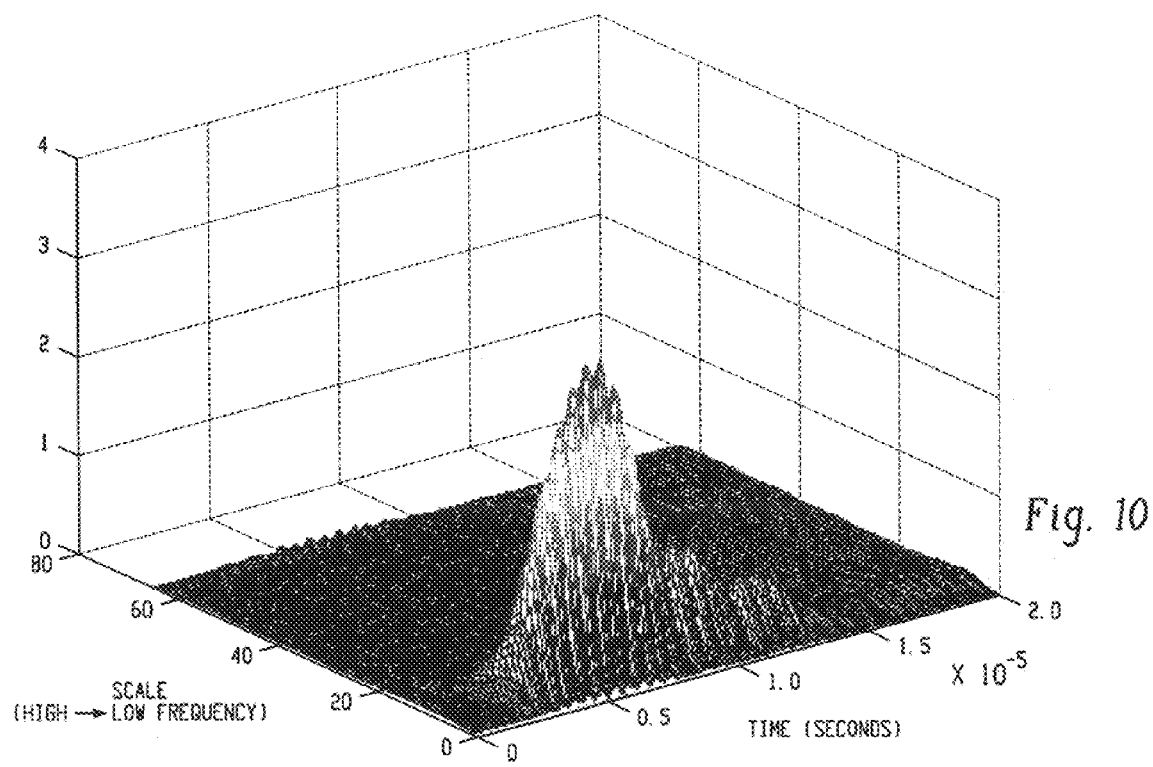
Figure 11:
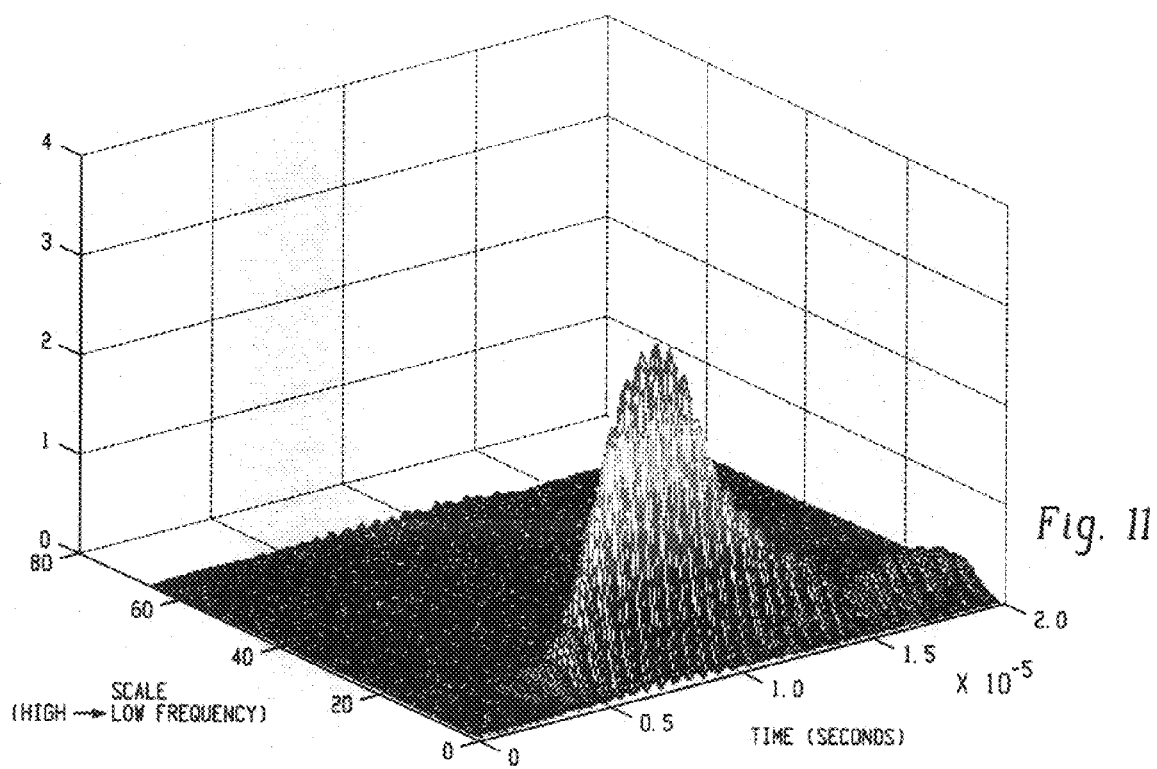
Figure 12:
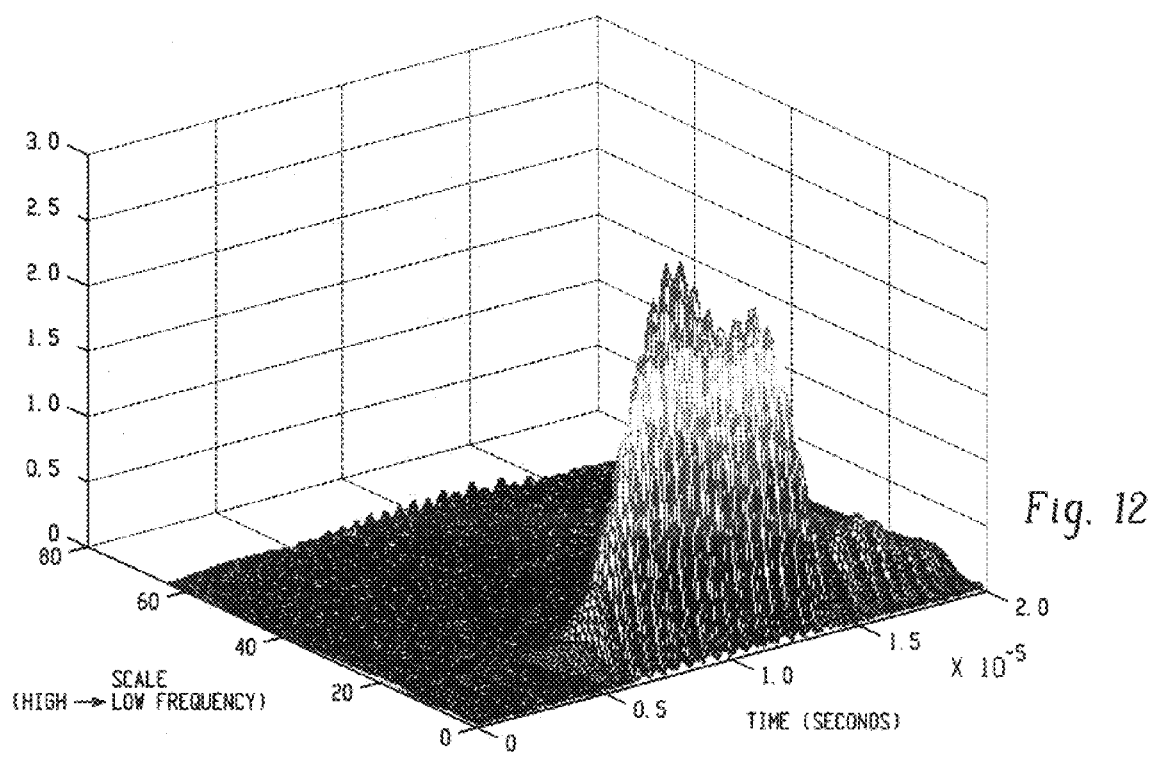
Figure 13:
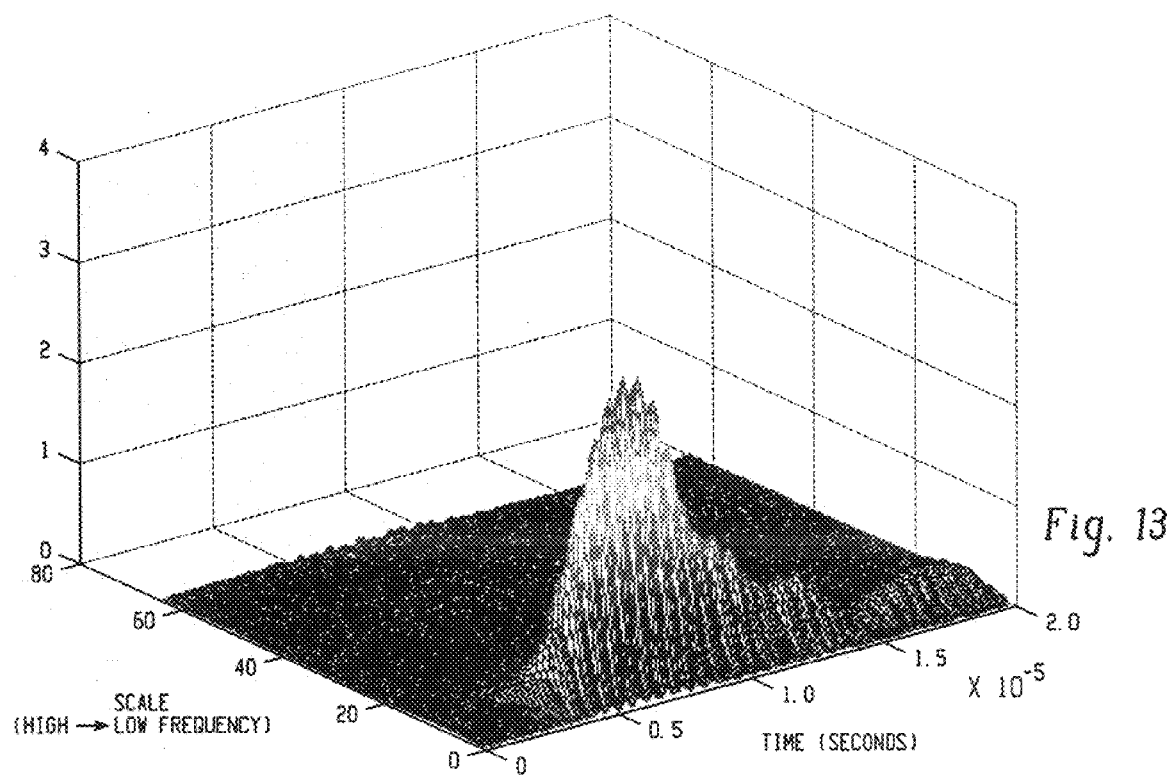
Figure 14:
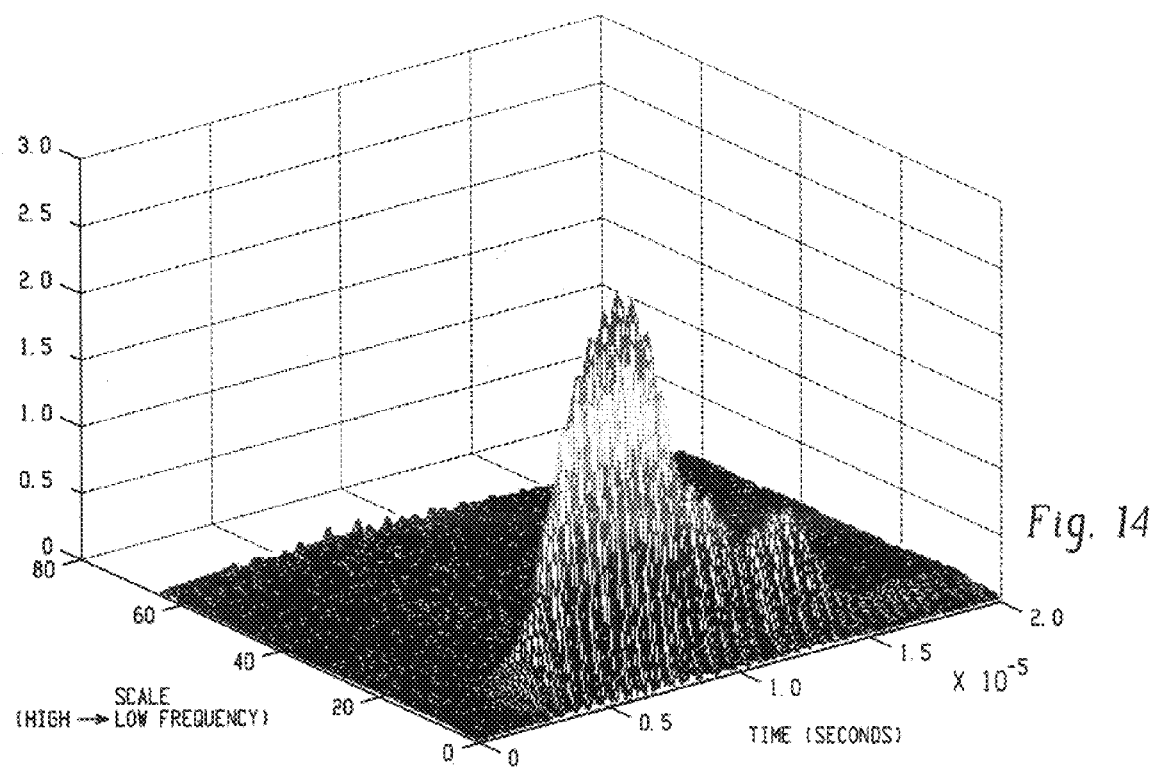

Examples of echoes received from the various objects within the tank are shown in FIGS. 4A–4K. The echoes illustrated in FIGS. 4A and 4B are exemplary of echoes reflected from the metal slab 13, the echo illustrated in FIG. 4C is exemplary of an echo reflected from the target 15, and the echoes illustrated in FIGS. 4D–4K are exemplary of echoes reflected from the liquid surface at various incidence angles in pitch and roll and combinations thereof. The reason for simulating the pitch and roll of a real aircraft in the present embodiment is to show that pitch and roll variations do not considerably affect time-frequency maps of the echoes as will become evident from the following description. All of the ultrasonic echoes are received by the ultrasonic transducer 40 and converted into electrical signal representations thereof. FIGS. 4A–4K are illustrations of the electrical signal representations of the foregoing described echo signals. The ordinate or Y-axis of each of the graphs of FIGS. 4A–4K represent a normalization of the echo between 1 and −1, and the abscissa of the graphs span between $-2\times10^{-5}$ seconds and $2\times10^{-5}$ seconds. The placement of the echo within each graph has no absolute relevance. Rather, the echoes of the graphs of FIGS. 4A–4K are used for comparison purposes based on time and amplitude.

The electrical echo signals form the transducer 40 are coupled to a sampling and digitizing circuit 56 over signal lines 58 wherein they are sampled and digitized to generate data samples of each echo signal. Conceptually, it does not matter how the signal is digitized, i.e. in real time or off line. In addition, the circuit 56 may be constantly sampling and digitizing through the interpulse periods or may be triggered to start sampling by a predetermined signal level detection depending on the application. The sampling frequency and computing horsepower may also vary based on the application. What matters is that at any given time there is a sufficient number of data samples to perform an analysis as will become more evident from the description hereinbelow. The minimum number of data samples depends on many factors such as the resolution of discrimination, the signal to noise ratio, and the wavelet shape to name just a few.

The digitized data samples of each echo, which may span over a period of 20 to 40 microseconds, for example, are stored in a conventional buffer memory 60. In the present embodiment, the circuits 56 and 60 are embodied by a Tektronix oscilloscope bearing model number TDS460A, which operates at around 25 million, samples per second. A programmed digital processor 62 is coupled to the buffer memory 60 and is programmed for accessing and processing the data samples of each of the aforementioned exemplary echo signals using a wavelet function to generate wavelet coefficients thereof in a wavelet domain, and for discriminating the ultrasonic echoes reflected from the various objects based on the wavelet coefficients of the echo data samples. The programmed digital processor 62 may be of the type including a microprocessor manufactured by Intel Corporation bearing model number i486, for example, the operation of which being well known to all those skilled in the pertinent art. However, it is understood that any digital processor conventional or otherwise may be used in the present embodiment without deviating from the principles of the present invention.

Wavelet processing of data samples of an echo has the advantage over other processing techniques of performing local analysis of the data samples in a time-frequency plan. This property is used to produce a 3-D map having a time variable in an X-axis, a scale variable in an Y-axis, and wavelet coefficients in a Z-axis. The scale variable is closely related to the signal frequency, i.e. the higher the scale, the lower the frequency. In the present embodiment, all data samples are scaled at substantially the same amplitude and at substantially the same time reference in order to permit the processor 62 to obtain results that are based solely on a time-scale (frequency) map of the echo data samples and not on the time map by itself only or on the frequency map by itself only (i.e. by using Fourier transform).

Because the exemplary echo waveforms as illustrated in FIGS. 4A–4K have a shape that resembles a Mexican hat in the time domain, the "Mexican hat" wavelet which is a well known wavelet function, is chosen for the present embodiment to perform the wavelet processing in the processor 62. An analytical expression for the Mexican hat wavelet is as follows:

$$\Psi(x) = \left(\frac{2}{\sqrt{3}}\pi^{-\frac{1}{4}}\right)(1-x^2)e^{-\frac{x^2}{2}}.$$

This choice for wavelet time-frequency analysis is considered to minimize the (nonzero) wavelet coefficients of echoes reflected from the liquid surface. The above expression may be substituted by any wavelet function in the equations found hereinbelow. Hence, the processing for discriminating echoes reflected by objects with different acoustic properties will be easier in the wavelet domain.

Wavelet transforms provide a multiresolution analysis with dilated windows. In contrast to the Fourier transform where all frequencies are analyzed by a fixed width window, Wavelet transforms can provide an adaptive windowing technique for frequency analysis. High frequency analysis is done using narrow windows, whereas low frequency analysis is done using wide windows. Unlike the properties of Fourier transform that are universal, properties of wavelet transforms are closely dependent on the shape of the wavelet function $\psi(t)$. Conceptually, any of the well-known wavelets such as Daubechies wavelet, Morlet wavelet, Meyer wavelet, or any other wavelet function, may be used instead of the Mexican Hat for this wavelet analysis. In fact, it is possible to construct one's own wavelet function in order to solve specific problems. The following explanation may help to understand the wavelet transform of the present embodiment and its mathematical background. In the present embodiment, the multiresolution analysis is performed by the digital processor 62 using a Matlab program.

The wavelet transform of a signal provides different details of the signal at different levels of resolutions. Each level of resolution defines a new vector space on which the original signal is projected. A projection is a mathematical operator that permits the approximation of the projected signal at the corresponding vector space. As we go further in decomposing the signal, the quality of the approximated signal becomes worse and worse. A wavelet representation provides a simple hierarchical framework for interpreting the signal information. The difference of information between two projections of the original signal f(x) at the levels of resolution $2^{j+1}$ and $2^j$ can be evaluated by decomposing the signal f(x) in a wavelet orthonormal basis. By translations and dilations of a single function $\psi(x)$, the mother wavelet, one may build the different elements of this basis. The resulting basis $((\sqrt{S}\psi(SX-t))_{(s,t)\in R^+xR})$ is used to represent any function of $L^2(R)$, where s is the scaling factor related to the frequencies of the signal f(x), t is the time translation, R is the set of all real numbers, $R^+$ is the subset of R of all positive real numbers and $L^2(R)$ is the set of finite energy functions. This decomposition of the signal f(x) defines an orthogonal multiresolution representation called the wavelet representation, which will be described hereinbelow.

Let $A_{2^j}$ be the operator which approximates the signal, f(x), at the level of resolution $2^j$ where f(x) has finite energy:

$$\left\{ f(x) \in L^2(R) \text{ i.e. } \int_{-\infty}^{+\infty} |f(x)|^2 dx < \infty \right\}.$$

Intuitively, we would expect such an approximation operator to meet the following conditions:

1: $A_{2^j}$ an involutive operator. This means that $A_{2^j}f(x)$, the approximation of $f(x)$ at the resolution $2^j$, is not modified if we approximate it at the same resolution $2^j$:

$$A_{2^j} \circ A_{2^j} = A_{2^j}$$

Hence $A_{2^j}$ is a projection operator on a particular space $V_{2^j} \subset L^2(R)$.

2: $A_{2^j}$ is orthogonal: The operator $A_{2^j}$ must provide the most "similar" function ($A_{2^j}f(x)$) to $f(x)$ among all the other possible operators in $V_{2^j}$. Hence the projection $A_{2^j}$ on $V_{2^j}$ must be the minimum:

$$\forall B_{2^j} \neq A_{2^j}, \|B_{2^j}f(x)-f(x)\| > \|A_{2^j}f(x)-f(x)\|$$

In other words $A_{2^j}$ must be an orthogonal projection on $V_{2^j}$.

3: $A_{2^j}$ is causal: It is obvious that the approximation of a signal at a resolution $2^{j+1}$ contains all the necessary information to compute the same signal at a smaller resolution $2^j$, but not conversely. This yields an important property of the associate vector spaces $V_{2^j}$: $\forall j \in Z$, $V_{2^j} \subset V_{2^{j+1}}$ 4: $A_{2^j}$ is shift invariant: Suppose that the approximation $A_{2^j}f(x)$ is characterized by $2^j$ samples per length unit. When $f(x)$ is translated by a length proportional to $2^{-j}$, $A_{2^j}f(x)$ is translated by the same amount. Mathematically speaking, there exists an isomorphism I: $V_1 \to l^2(z)$. ($l^2(z)$ is the space of square summable sequences:

$$l^2(z) = \left\{ (\alpha_i)_{i \in Z} \ni \sum_{-\infty}^{+\infty} |\alpha_i|^2 < \infty \right\}$$

such that:

$$I(A_1 f(x)) = (\alpha_i)_{i \in Z} <=> I(A_1 f(x-k)) = (\alpha_{i-k})_{i \in Z}$$

5: $A_{2^j}$ is consistent: $A_{2^j}$ has to provide a similar approximation of $f(x)$ at all resolutions. Which yields:

$$f(x) \in V_{2^j} <=> f(2x) \in V_{2^{j+1}}$$

6: $A_{2^j}$ is asymptotically convergent: As the resolution increases to $+\infty$ the approximated signal should converge to the original signal; conversely as the resolution decreases to zero, the approximated signal contains less and less information and converges to zero:

$$\lim_{j \to \infty} V_{2^j} = \bigcup_{-\infty}^{+\infty} V_{2^j}, \text{ and } \lim_{j \to \infty} V_{2^j} = \bigcap_{-\infty}^{+\infty} V_{2^j} = \{0\}$$

Any vector space $(V_{2^j})_{j \in Z}$ that satisfies the above properties is called a multiresolution approximation of $L^2(R)$. The associated set of operators $(A_{2^j})_{j \in Z}$ give the approximation of any $L^2(R)$ function at a resolution $2^j$.

How to build an orthogonal basis of $(V_{2^j})_{j \in Z}$ will now be explained. It is shown that for a given vector space $(V_{2^j})$, there exists a unique function $\phi(x) \in L^2(R)$, called the scaling function, such that $(\sqrt{2^{-j}}\phi_{2^j}(x-2^{-j}n))_{n \in Z}$ is an orthonormal basis of $V_{2^j}$, where, $$\phi_{2^j}(x) = 2^j \phi(2^j x), \forall j \in Z$$

The orthogonal projection of the signal $f(x)$ being analyzed on $V_{2^j}$ (i.e. the approximation of the signal $f(x)$ at the resolution $2^j$) can be now computed by decomposing $f(x)$ on the orthonormal basis $(\sqrt{2^{-j}}\phi_{2^j}(x-2^{-j}n))_{n \in Z}$:

$$\forall f(x) \in L^2(R),$$

$$A_{2^j} f(x) = 2^{-j} \sum_{n=-\infty}^{+\infty} \langle f(u), \phi_{2^j}(u-2^{-j}n) \rangle \phi_{2^j}(x-2^{-j}n).$$

Note, that the factor n discretizes the approximation of the signal $f(x)$. Hence, the discrete approximation of $f(x)$ at the resolution $2^j$ is characterized by the following set of inner products where d is an index representing the specific data sample and $f(u)$ represents a measure of the signal being analyzed at the sample d:

$$A_2^d f = (\langle f(u), \phi_{2^j}(u-2^{-j}n) \rangle)_{n \in Z},$$

By changing variables in the inner product, it can be shown that:

$$\langle f(u), \phi_{2^j}(u-2^{-j}n) \rangle = \quad \text{Equation (E)}$$

$$\sum_{n=-\infty}^{+\infty} \tilde{h}(2n-k) \langle f(u), \phi_{2^{j+1}}(u-2^{-j-1}k) \rangle$$

where $\tilde{h}(n)$ is the impulse response of a discrete filter $\tilde{H}(\omega)$ that is a Fourier transform which may be configured for a specific wavelet function, like the Mexican hat wavelet, for example, by the following expression $\Psi(2\omega)=(H(\omega)\phi(\omega))$. Let H be the discrete filter whose impulse response is given by:

$$\forall n \in Z, h(n) = \langle \phi_{2^{-1}}(u), \phi(u-n) \rangle.$$

$\tilde{H}$ is called the mirror filter of H i.e.:

$$\forall n \in Z, \tilde{h}(n) = h(-n).$$

Accordingly, The scaling function $\phi(x)$ can be defined as the basic function such that the set $(\sqrt{2^{-j}}\phi_{2^j}(x-2^{-j}n))_{n \in Z}$ forms an orthonormal basis of $V_{2^j}$ which meets the above six conditions of a multiresolution vector space. In practice there are some conditions (i.e. the admissibility and the regularity conditions) put on $\phi(x)$ to be a scaling function.

Recall that our goal is to build a multiresolution representation based on the differences of information at two successive levels of resolutions. This representation is possible by decomposing the signal $f(x)$ on a wavelet orthonormal basis. The difference of information, called the detail signal, at the resolution $2^j$ represents the lost details of the signal $f(x)$ when moving from a fine resolution ($V_{2^{j+1}}$) to the right next coarser resolution ($V_{2^j}$). The idea is to decompose the finer multiresolution vector space $V_{2^{j+1}}$ into a direct sum of $V_{2^j}$ and $O_{2^j}$, where $O_{2^j}$ is the orthogonal complement of $V_{2^j}$ on $V_{2^{j+1}}$, hence:

$$O_{2^j} \oplus V_{2^j} = V_{2^{j+1}}.$$

In order to compute the orthogonal projection of $f(x)$ on $O_{2^j}$, one needs to find an orthonormal basis of $O_{2^j}$. As the basis for $V^{2^j}$ has been built by dilation and translation of the scaling function $\phi(x)$, the same strategy will be used to build a basis for $O_{2^j}$. The basic function for $O_{2^j}$, denoted by $\psi(x)$, is the mother wavelet. Thus $(\sqrt{2^{-j}}\psi_{2^j}(x-2^{-j}n))_{n\in Z}$ is an orthonormal basis of $O_{2^j}$ and $(\sqrt{2^{-j}}\psi_{2^j}(x-2^{-j}n))_{(n,j)\in Z^2}$ is an orthonormal basis of $L^2(R)$.

It is worth noting that the mother wavelet, which may be the Mexican hat wavelet for the present embodiment, and the scaling function are related together in the frequency domain (i.e $\hat{\psi}(2w)=G(w)\hat{\phi}(w)$). Accordingly, the Fourier transform filters H and G constitute a pair of quadrature mirror filters, i.e. $(G(w)=e^{-iw}\overline{H(w+\pi)})$, or equivalently in the discrete time domain:

$$\forall n\in Z, \quad g(n)=(-1)^{1-n}h(1-n),$$

where $g(n)$ is the discrete impulse response of the filter $G(\omega)$ configured for a wavelet function, like the Mexican hat wavelet, for example, and $h(-n)$ is the discrete impulse response of the filter $H(\omega)$ described above.

Now, let $D_{2^j}f$ be the discrete detail signal at the resolution $2^j$. This coefficient can be written as: $D_{2^j}f=(<f(u),\psi_{2^j}(u-2^{-j}n)>)_{n\in Z^j}$. Thus, $$\langle f(u), \psi_{2^j}(u-2^{-j}n)\rangle = \sum_{n=-\infty}^{+\infty} \tilde{g}(2n-k)\langle f(u), \phi_{2^{j+1}}(u-2^{-j-1}k)\rangle \quad \text{Equation (E')}$$

Figure 15:
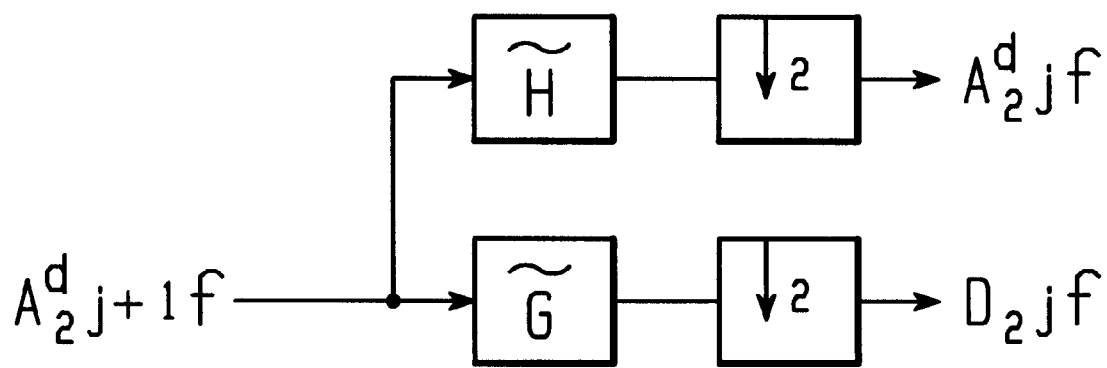
FIG. 15 is a functional block diagram of an embodiment for wavelet function processing suitable for use in the embodiment of FIG. 2.

Equations (E) and (E') above describe the decomposition of the discrete projected signal (i.e. $A_2^{d+1}f$) into the approximation at a coarser resolution ($A_2^d f$) and into the signal detail ($D_{2^j}f$) as depicted in the embodiment of FIG. 15, wherein the discrete signal (i.e. approximation ($A_2^{d+1}f$)) is decomposed into an approximation at coarser resolution ($A_2^d f$), and into the detail signal ($D_{2^j}f$). Referring to FIG. 15, in the filter blocks of H and G, the discrete signal $A^d_{2^{j+1}}f$ is convolved with the respective filter H and G and in the functional block following each filter block, the samples output from the respective filter block are downsampled by selecting every one of two samples.

The 3-D mapping results of the wavelet signal processing of the representative echoes of FIGS. 4A–4K according to the embodiment of FIG. 15 using a sliding data sample window of a predetermined number of samples, like one hundred (100) samples, for example, are illustrated in FIGS. 5–14. Each illustration shows the wavelet coefficients of the 10 representative echoes in a time-frequency plan. Referring to FIGS. 5–14, by comparing the wavelet coefficients of each representative echo, it can be determined which echo is reflected by a non-liquid object and which is reflected by the liquid surface (regardless the incidence angle of the tank). Unlike an echo reflected by a non-liquid object, like the target 15 or slab 13, for example, echoes reflected by the liquid surface are well localized in frequency.

A practical criterion that may be implemented in a program of the processor 62 to differentiate between the two aforementioned kinds of echoes is to compute the energy of each echo, excluding the energy of the main lobe, in the wavelet domain. In the present embodiment, the energy of an echo is defined as the calculated volume of the shape or envelope limited by the amplitude of wavelet coefficients, time, and scale (i.e. frequency) in the wavelet domain as shown in FIGS. 5–14, each showing the energy of a corresponding one of the aforementioned representative echoes as the volume under the wavelet coefficient envelope in the time-frequency plan. These different energy values (excluding the energy in the main lobe) of 11 representative echoes are recorded in the first row of the following table. The second row of the table shows the energy ratio of the energy of a selected echo, like the echo reflected by the target (i.e. pin), for example, and the other echoes.

| Signal | Echo 1 (Slab) | Echo 2 (Slab) | Echo 3 (pin) | Echo 4 face) | Echo 5 (Surface) | Echo 6 (Surface) |
|---|---|---|---|---|---|---|
| Energy × 1000 | 0.1161 | 0.0693 | 0.0868 | 0.0147 | 0.0238 | 0.0124 |
| Ratio of energies | 0.7480 | 1.2532 | 1.0000 | 5.9159 | 3.6537 | 6.9894 |

| Signal | Echo 7 (Surface) | Echo 8 (Surface) | Echo 9 (Surface) | Echo 10 (Surface) | Echo 11 (Surface) |
|---|---|---|---|---|---|
| Energy × 1000 | 0.0186 | 0.0171 | 0.0151 | 0.0258 | 0.0420 |
| Ratio of energies | 4.6737 | 5.0664 | 5.7545 | 3.3601 | 2.0683 |

It is recognized, from the above table, that the energy of an echo reflected by the fuel surface is at least 2 times higher than the energy of an echo reflected by a metal object (either in the form of a slab or a pin). Hence, in the present embodiment, a program is provided to be executed in the processor 62 to differentiate between the two kind of echoes by computing the energies (excluding the energy of the main lobe) of the echoes and comparing them. In the present example, the echo that has the lower energy is the echo reflected by the liquid surface.

The representative echoes may be categorized in two families: echoes reflected by objects inside the tank and echoes reflected by the fuel surface (air). The recognized difference between the two categories is mainly due to the reflecting object (and not due to the angle of incidence or to the distance from the transmitter.) as demonstrated by the foregoing described wavelet analysis as recorded in the above table. Therefore, wavelets are shown to be an efficient tool to discriminate echoes reflected from various objects in the fuel tank. For instance, applying wavelets to differentiate between echoes reflected by a possible residual of water in the bottom of the tank from echoes reflected from the fuel surface or from echoes reflected by a target is possible using similar wavelet processing programs. Multiple echoes reflected by the fuel surface (regardless their angles of incidence) and echoes reflected by other targets may also be discriminated in accordance to the above described method. In fact, high order level ($2^{nd}$, $3^{rd}$, etc.) echoes reflected by the fuel surface share a common frequency property (i.e. they are all reflected by the fuel surface)which makes them differentiable from echoes reflected by the target. Wavelet processing may also be applied to differentiate between multiple echoes (reflected by the fuel surface) themselves.

In general, wavelet techniques could be used to discriminate between different echoes in fluids based on time-frequency properties. This notion could be extended to higher dimension signals. Consider for instance 2-D signals (images.). Discrimination between images of different objects could be done easily at the frequency-space hyper plan (after a wavelet analysis.) This discrimination might be very difficult at the frequency domain alone (Fourier transform) or at the space domain alone. Signals with higher dimensions (matrices) could also be addressed in this context.

While the present invention has been described hereinabove in connection with a specific embodiment, it is understood that it should not be limited in any way to that embodiment or any equivalent embodiment, but rather construed in breadth and broad scope in accordance with the appended claims.

We claim:

1. A method of discriminating among ultrasonic echoes reflected from various objects in a tank containing liquid, said method comprising the steps of:
generating an ultrasonic signal in said tank of liquid;
receiving ultrasonic echoes reflected from various objects in said tank including a surface of the liquid in response to said generated ultrasonic signal;
converting the received ultrasonic echoes into electrical echo signals representative thereof;
sampling said electrical echo signals in time to generate data samples thereof;
processing said data samples of each echo using a wavelet function to generate wavelet coefficients thereof in a wavelet domain; and
discriminating said ultrasonic echoes-reflected from said various objects based on said wavelet coefficients of the data samples.

2. The method of claim 1 wherein the step of discriminating includes the step of discriminating an echo reflected from the liquid surface from echoes reflected from other objects based on the wavelet coefficients of the data samples of said echoes.

3. The method of clam 1 wherein the step of discriminating includes the steps of:
determining an energy of each ultrasonic echo from the wavelet coefficients thereof; and
second discriminating the ultrasonic echoes based on the determined energies thereof.

4. The method of claim 3 wherein the step of determining an energy of each echo includes the steps of establishing a wavelet coefficient envelope above a time-frequency plane in the wavelet domain for each echo; and calculating a volume under the wavelet coefficient envelope in the wavelet domain for each echo as representative of the corresponding energy thereof.

5. The method of claim 4 wherein the step of second discriminating includes the step of comparing the calculating volumes of the echoes.

6. The method of claim 4 wherein the step of second discriminating including the steps of:
selecting a volume of the calculated volumes;
calculating a ratio of each volume of an echo to said selected volume; and
discriminating the echoes based on a comparison of said volume ratios.

7. The method of claim 6 wherein the step of third discriminating includes the step of discriminating an echo reflected from the liquid surface from echoes reflected from other objects based on the comparison of the volume ratios.

8. The method of claim 3 wherein the step of second discriminating includes the step of comparing the determined energies of the echoes.

9. The method of claim 8 wherein the step of second discriminating includes the step of discriminating an echo reflected from the liquid surface from echoes reflected from other objects based on the comparison of the energies thereof.

10. The method of claim 1 wherein the step of processing includes the step of processing said data samples of each echo using a "Mexican Hat" wavelet function to generate wavelet coefficients thereof in a wavelet domain.

11. The method of claim 1 wherein the tank includes at least two separable liquids, each having a different liquid surface from which to reflect the ultrasonic echoes; and the step of discriminating includes the step of discriminating the ultrasonic echoes reflected from said different liquid surfaces based on said wavelet coefficients of the data samples.

12. The method of claim 1 wherein the step of discriminating includes the step of discriminating an echo reflected from the liquid surface independent of an angle of incidence of the liquid surface from echoes reflected from other objects based on the wavelet coefficients of the data samples of said echoes.

13. The method of claim 1 wherein the step of discriminating includes the step of discriminating an echo reflected by the liquid surface from echoes reflected by other objects based on the wavelet coefficients of the data samples of said echoes.

14. Apparatus for discriminating among ultrasonic echoes reflected from various objects in a tank containing liquid, said apparatus comprising:
an ultrasonic transducer disposed at the tank;
means for exciting said ultrasonic transducer to generate an ultrasonic signal in said tank of liquid, said ultrasonic transducer for receiving ultrasonic echoes reflected from various objects in said tank including a surface of the liquid in response to said generated ultrasonic signal for converting the received ultrasonic echoes into electrical echo signals representative thereof;
means for sampling and digitizing said electrical echo signals in time to generate digitized data samples thereof; and
means for processing said digitized data samples of each echo using a wavelet function to generate wavelet coefficients thereof in a wavelet domain and to discriminate said ultrasonic echoes reflected from said various objects based on said wavelet coefficients of the digitized data samples.

15. The apparatus of claim 14 including a buffer memory for storing the digitized data samples of each reflected echo.

16. The apparatus of claim 14 wherein the processing means comprises a programmed digital processor.

17. The apparatus of claim 14 wherein the tank is an aircraft fuel tank and the liquid comprises aircraft fuel.

18. The apparatus of claim 17 wherein the processing means comprises a programmed digital processor including a program for discriminating an echo reflected by a surface of the fuel from echoes reflected by other objects based on the wavelet coefficients of the digitized data samples thereof.

19. The apparatus claim 18 wherein the digital processor includes a program for discriminating an echo reflected by the fuel surface independent of an angle of incidence of the fuel surface from echoes reflected by other objects inside the tank based on the wavelet coefficients of the digitized data samples of said echoes.

20. The apparatus of claim 17 wherein the tank includes aircraft fuel and at least one other separable liquid, each having a different liquid surface from which to reflect the ultrasonic echoes; and wherein the processing means comprises a programmed digital processor including a program for discriminating the ultrasonic echoes reflected from said different liquid surfaces based on said wavelet coefficients of the digitized data samples.

* * * * *

UNITED STATES PATENT AND TRADEMARK OFFICE
CERTIFICATE OF CORRECTION

PATENT NO.     : 6,397,679 B1
DATED          : June 4, 2002
INVENTOR(S)    : Mokhtar Sadok et al.

It is certified that error appears in the above-identified patent and that said Letters Patent is hereby corrected as shown below:

<u>Column 11,</u>
Line 50, insert the word -- third -- before the word "discriminating".

Signed and Sealed this

Eleventh Day of November, 2003

JAMES E. ROGAN
*Director of the United States Patent and Trademark Office*